(12) United States Patent
Takei et al.

(10) Patent No.: US 8,107,176 B2
(45) Date of Patent: Jan. 31, 2012

(54) LENS DRIVE DEVICE

(75) Inventors: Hiromitsu Takei, Nagano (JP); Tatsuya Nagayoshi, Nagano (JP)

(73) Assignee: Nidec Sankyo Corporation (JP)

(*) Notice: Subject to any disclaimer, the term of this patent is extended or adjusted under 35 U.S.C. 154(b) by 0 days.

(21) Appl. No.: 12/796,865

(22) Filed: Jun. 9, 2010

(65) Prior Publication Data

US 2010/0309568 A1    Dec. 9, 2010

(30) Foreign Application Priority Data

Jun. 9, 2009    (JP) ................................. 2009-138133

(51) Int. Cl.
*G02B 7/02*    (2006.01)
(52) U.S. Cl. .......................... 359/824; 359/811; 359/813
(58) Field of Classification Search .................. 359/811, 359/813, 819, 822–824
See application file for complete search history.

(56) References Cited

U.S. PATENT DOCUMENTS 7,262,927 B1*  8/2007  Shyu et al. ..................... 359/823
7,724,449 B2*  5/2010  Takei et al. ..................... 359/704

FOREIGN PATENT DOCUMENTS

JP    2009-36825 A    2/2009

* cited by examiner

*Primary Examiner* — Ricky Mack
*Assistant Examiner* — Brandi Thomas
(74) *Attorney, Agent, or Firm* — Cantor Colburn LLP

(57) ABSTRACT

A lens drive device may include a support body, a movable body having a lens, a magnetic drive mechanism having a coil mounted on the movable body and a magnet mounted on the support body for magnetically driving the movable body in a lens optical axis direction, two spring pieces which are connected between the movable body and the support body for supporting the movable body and which is used as a power supply member to the coil, and two binding pins which are provided in the movable body and around which coil ends of winding start and winding end of the coil are wound. Portions of the coil ends which are wound around the binding pins are electrically connected with the spring pieces.

12 Claims, 10 Drawing Sheets

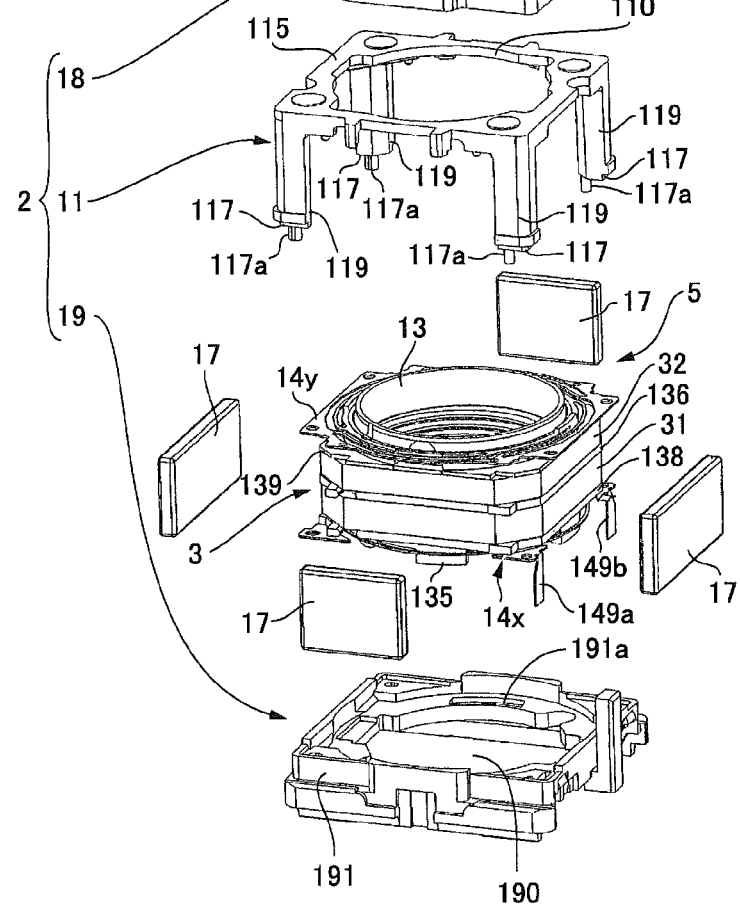

LENS DRIVE DEVICE

CROSS REFERENCE TO RELATED APPLICATION

The present invention claims priority under 35 U.S.C. §119 to Japanese Application No. 2009-138133 filed Jun. 9, 2009, the entire content of which is incorporated herein by reference.

FIELD OF THE INVENTION

At least an embodiment may relate to a lens drive device in which a power to a coil provided on a movable body having a lens is supplied through a spring member.

BACKGROUND

A lens drive device which is mounted on a cell phone with a camera, a digital camera or the like includes a movable body provided with a lens, a support body disposed on an outer side of the movable body, and a magnetic drive mechanism which magnetically drives the movable body in a lens optical axis direction. Further, the lens drive device is provided with a first spring member, which is connected with a base used as the support body and the movable body, and a second spring member which is connected with a cover used as the support body and the movable body. An urging force of the spring member and a thrust force by the magnetic drive mechanism are balanced with each other for moving the movable body to a predetermined position in the optical axis direction.

In this case, the first spring member may be divided into a plurality of spring pieces and end parts of a coil are connected with the spring pieces so that the spring pieces are utilized as power supply members for the coil (see, for example, Japanese Patent Laid-Open No. 2009-36825).

However, in order to connect the coil ends with the spring pieces by a method such as soldering as described in the above-mentioned Patent Reference, the coil ends are required to be bound around somewhere of the movable body until soldering is performed and, at the time of soldering, it is necessary to release the binding and thus much labors are required. In addition, in order to perform soldering of the coil end to the spring piece, preliminary solder for the coil end, reinforcing adhesion for preventing loosening of the coil end and the like are required and thus its productivity is considerably low. Further, in the structure as described in the above-mentioned Patent Reference, preliminary solder for the coil end and soldering of the coil end to the spring piece are required. Therefore, quality problems may occur in which, for example, foreign matters such as solder slag are stuck to and around the spring piece and thus the spring piece is deformed and movement of the movable body is disturbed.

SUMMARY

In view of the problems described above, at least an embodiment of the present invention may advantageously provide a lens drive device which is capable of attaining a high degree of productivity and quality even when spring pieces are utilized as a power supply member to a coil.

According to at least an embodiment of the present invention, there may be provided a lens drive device including a support body, a movable body having a lens, a magnetic drive mechanism having a coil mounted on the movable body and a magnet mounted on the support body for magnetically driving the movable body with respect to the support body in a lens optical axis direction, two spring pieces which are connected between the movable body and the support body for supporting the movable body and which is used as a power supply member to the coil, and two binding pins which are provided in the movable body and around which coil ends of winding start and winding end of the coil are wound. Portions of the coil ends which are wound around the binding pins are electrically connected with the spring pieces. Specifically, it may be structured that the movable body is movably supported in the lens optical axis direction by the support body through an image side spring member and an object side spring member which are made of a metal thin plate, and the two spring pieces which are used as a power supply member to the coil are structured so that the image side spring member is divided into two pieces. Further, the support body may include a spring support member which is provided with a frame-shaped part with which the object side spring member is connected and four columnar shaped parts which are protruded toward an imaging element side from the frame-shaped part, and the two spring pieces which are the image side spring member may be supported by the columnar shaped part.

In accordance with an embodiment of the present invention, portions of the coil ends of winding start and winding end of the coil which are wound around the binding pins are electrically connected with the spring pieces. Therefore, when the coil ends and the spring pieces are to be electrically connected with each other, the coil ends are not required to release from the binding pins. Further, preliminary solder for the coil end required to solder the coil end with the spring piece, reinforcing adhesion for preventing loosening of the coil end and the like are not required. In addition, problems are prevented in which, for example, solder slag is stuck to and around the spring piece and thus the spring piece is deformed and movement of the movable body is disturbed. Therefore, even when the spring piece is utilized in power supply to the coil, a high degree of productivity and quality can be attained.

In accordance with an embodiment of the present invention, the binding pin is made of metal. According to this structure, the coil end and the binding pin are fixed by welding, soldering or the like.

In accordance with an embodiment of the present invention, the spring piece is provided with a coil connecting terminal part having a bent shape so as to be along a periphery of the binding pin, and the coil end is electrically connected with the coil connecting terminal part. Specifically, each of the two spring pieces is provided with a fixed side connecting part which is held by the support body, a movable side connecting part which is connected with the movable body, and an arm part which connects the movable side connecting part with the fixed side connecting part, and the movable side connecting part of the spring piece is provided with a coil connecting terminal part having a bent shape so as to be along a periphery of the binding pin. According to this structure, welding or soldering work is easily performed when the coil connecting terminal part and the coil end are to be connected with each other and, since the joining area becomes wider, a high degree of reliability can be obtained in the connected portion.

In accordance with an embodiment of the present invention, the coil connecting terminal part is provided with elasticity so as to be capable of being elastically deformed when the coil connecting terminal part is abutted with the portion of the coil end which is wound around the binding pin. According to this structure, since the coil connecting terminal part and the binding pin are disposed close to each other in an assembling step, a high degree of working efficiency is attained. In this case, it may be structured that the coil connecting terminal part is formed in a shape so that the coil connecting terminal part is capable of being resiliently bent toward an inner side in a radial direction, and a root portion of the coil connecting terminal part is formed with a cut-out part toward an inner side in the radial direction from an outer side so that the coil connecting terminal part is capable of being easily resiliently deformed.

In accordance with an embodiment of the present invention, the coil end is wound around the binding pin in plural turns and, among the plural turns, a part of the plural turns on a winding start side of the coil end of winding start which is wound around the binding pin and a part of the plural turns on a winding end side of the coil end of winding end which is wound around the binding pin are performed with soldering or melting operation for electrical connection with the spring piece, and remaining parts of the plural turns are not performed with soldering or melting operation. According to this structure, soldering or melting operation is not performed on a winding portion on a coil winding side of the coil end and thus flexibility of a coil wire can be secured. Therefore, even when a force is applied to the coil wire, the coil wire is hard to be disconnected.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

An embodiment of the present invention will be described below with reference to the accompanying drawings. A lens drive device which will be described below is capable of being mounted on various electronic apparatuses in addition to a cell phone with a camera. For example, the lens drive device may be mounted on a thin-type digital camera, a PHS, a PDA, a bar code reader, a monitoring camera, a camera for rear confirmation in a car, a door having optical authentication function or the like.

Figure 1A:
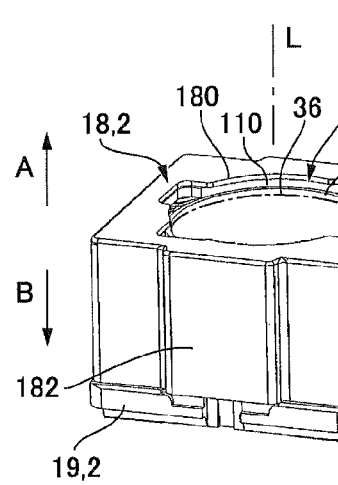
FIGS. 1(a) and 1(b) are explanatory perspective views showing the entire structure of a lens drive device in accordance with an embodiment of the present invention.
Figure 1B:
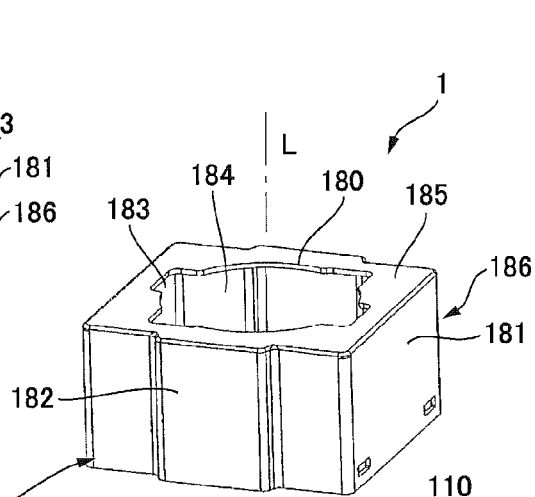
Figure 2:
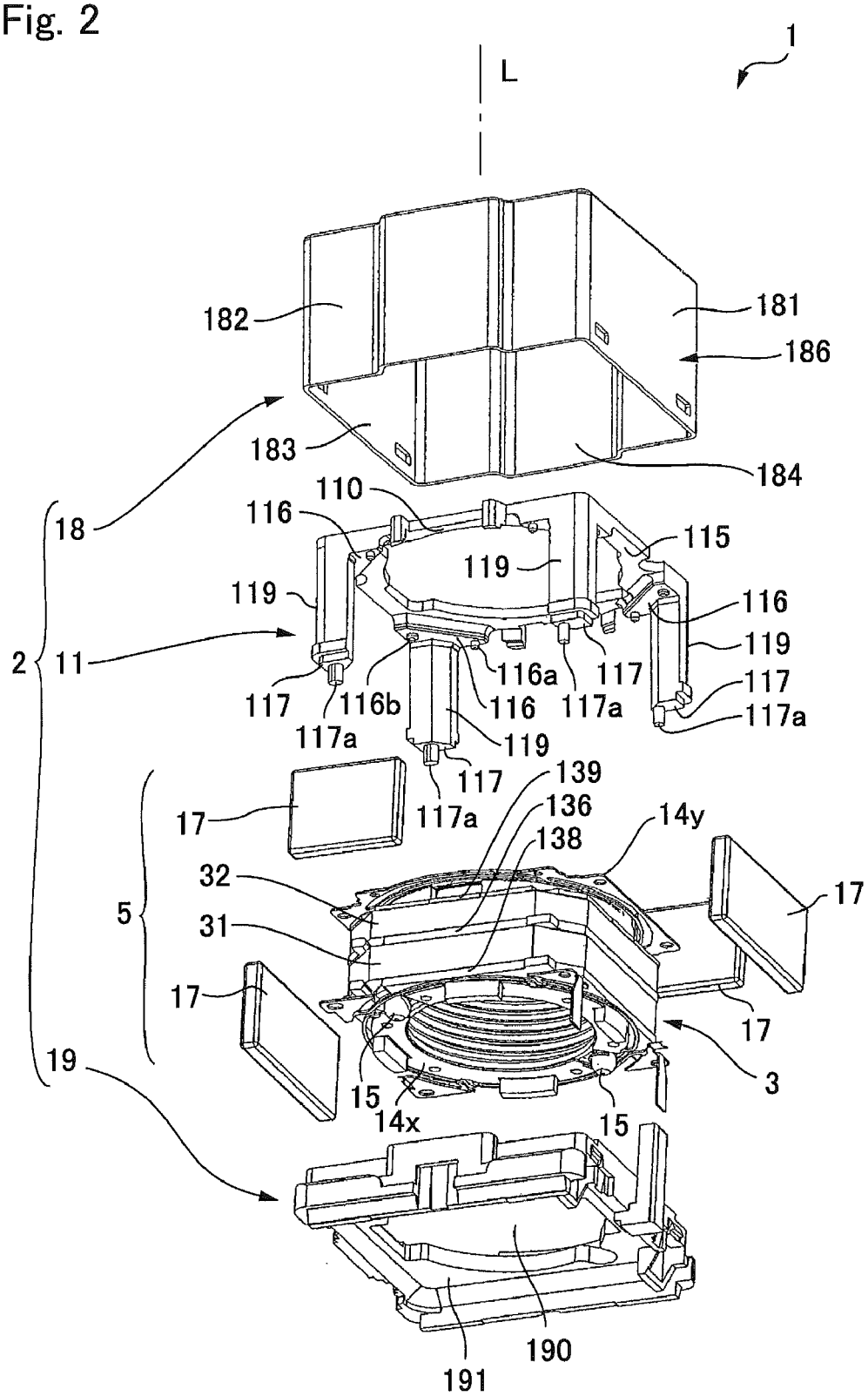
FIG. 2 is an exploded perspective view showing a lens drive device in accordance with an embodiment of the present invention which is viewed from a side opposite to an object to be photographed side (imaging element side).
Figure 3A:
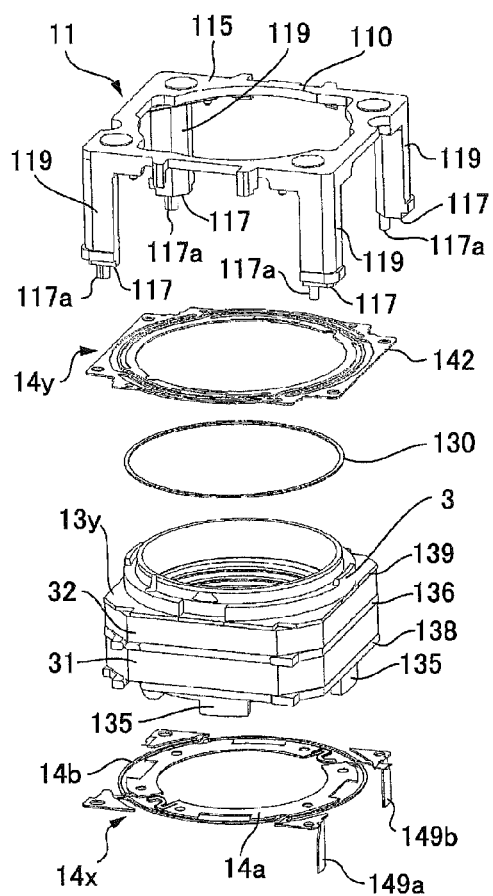
FIGS. 3(a) and 3(b) are exploded perspective views showing a movable body and the like which are used in a lens drive device in accordance with an embodiment of the present invention and which are further disassembled into pieces.
Figure 3B:
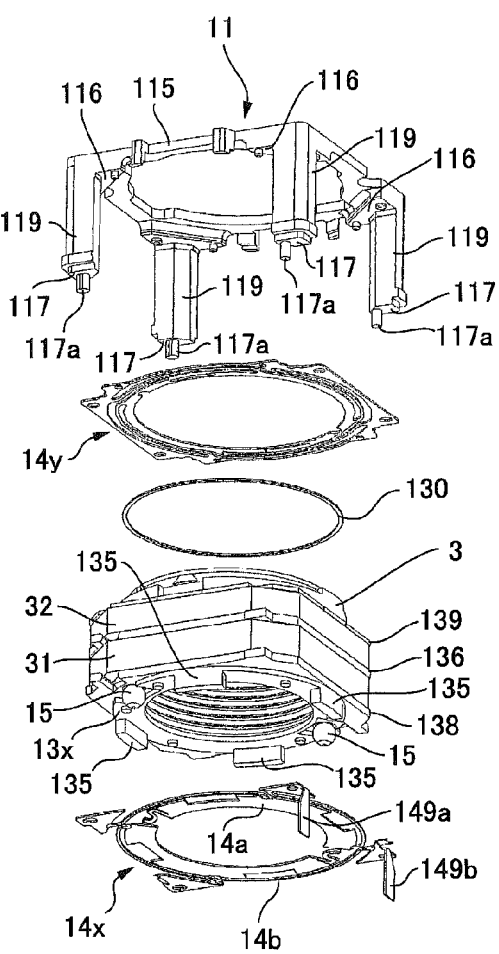

FIGS. 1(a) and 1(b) are explanatory perspective views showing the entire structure of a lens drive device in accordance with an embodiment of the present invention. FIG. 1(a) is an outward appearance view showing the lens drive device in accordance with an embodiment of the present invention which is viewed from an object to be photographed side and FIG. 1(b) is an exploded perspective view showing the lens drive device which is viewed from an object to be photographed side. FIG. 2 is an exploded perspective view showing a lens drive device in accordance with an embodiment of the present invention which is viewed from a side opposite to an object to be photographed side (imaging element side). FIGS. 3(a) and 3(b) are exploded perspective views showing a movable body and the like which are used in a lens drive device in accordance with an embodiment of the present invention and which are further disassembled into pieces. FIG. 3(a) is a view which is viewed from an object to be photographed side and FIG. 3(b) is a view which is viewed from an imaging element side.

In FIGS. 1(a) through 3(b), a lens drive device 1 in this embodiment is structured so that a lens 36 and a diaphragm are moved along an optical axis direction "L" in both of an "A"-direction (front side) toward an object to be photographed (object side) and a "B"-direction (rear side) toward an opposite side (image side) to the object to be photographed in a thin camera which is used in a cell phone with a camera or the like. The lens drive device 1 is formed in a substantially rectangular parallelepiped shape. The lens drive device 1 generally includes a movable body 3, which is provided with a cylindrical lens holder 37 having one or plural pieces of lenses 36 and a fixed diaphragm in its inside, a magnetic drive mechanism 5 for moving the movable body 3 along the optical axis direction "L", and a support body 2 on which the magnetic drive mechanism 5, the movable body 3 and the like are mounted. The movable body 3 includes a sleeve 13 formed in a tube-like shape and a lens holder 30 in a cylindrical shape is fixed on its inside by a screw mechanism.

Therefore, an outward shape of the movable body 3 is determined by the sleeve 13 and formed in a roughly rectangular pole shape.

The support body 2 includes a holder 19 made of a rectangular resin plate for holding an imaging element (not shown) on an image side, and includes a box-shaped yoke 18 and a spring support member 11 on an object to be photographed side. Circular incident windows 110 and 180 are respectively formed at centers of the spring support member 11 and the yoke 18 for taking light from an object to be photographed into the lens 36. The yoke 18 is structured of a ferromagnetic plate such as a steel plate. As described below, together with magnets 17, the yoke 18 structures an interlinkage magnetic field generating body for generating an interlinkage magnetic field in a first coil 31 and a second coil 32 which are held by the sleeve 13.

The holder 19 is formed with an opening part 190 at a center portion of a rectangular main body portion 191 so that incident light through the lens 36 is capable of being received by the imaging element. The main body portion 191 of the holder 19 is formed with a recessed part 191a which is used for restricting a turning range of the sleeve 13 or restricting movement in a radial direction of the sleeve 13. In this embodiment, the holder 19 and the yoke 18 are joined with each other through the spring support member 11. In other words, as described below, since the spring support member 11 is provided with columnar shaped parts 119 having a protruded part 117a, the holder 19 and the spring support member 11 are connected with each other through the protruded parts 117a. Further, the spring support member 11 is fixed to an inner face of the yoke 18 through a frame-shaped part 115.

The magnetic drive mechanism 5 includes the first coil 31 and the second coil 32, which are wound around an outer peripheral face of the sleeve 13, and the interlinkage magnetic field generating body for generating an interlinkage magnetic field in the first coil 31 and the second coil 32. The magnetic drive mechanism 5 is structured of the first coil 31, the second coil 32 and the interlinkage magnetic field generating body. The interlinkage magnetic field generating body includes four magnets 17 and the yoke 18 which are faced with the first coil 31 and the second coil 32 on their outer peripheral sides.

The yoke 18 is formed in a box-like shape which is provided with a top plate part 185 for covering an upper face side of the second coil 32 located on an object to be photographed side and a rectangular tube-shaped body part 186. The rectangular tube-shaped body part 186 is provided with side plate parts 181, 182, 183 and 184 which cover side faces of the first coil 31 and the second coil 32 and thus leakage flux from magnetic paths structured between the magnets 17 and the first coil 31 and the second coil 32 is reduced. According to this structure, a linearity between a moving amount of the movable body 3 and a current supplied to the first coil 31 and the second coil 32 is improved.

In this embodiment, four magnets 17 are respectively formed in a rectangular plate shape and fixed to side portions on an inner side of the side plate parts 181, 182, 183 and 184 except four corners of the yoke 18. Each of four magnets 17 is divided into two pieces in the optical axis direction "L" and each of the magnets 17 is magnetized so that its inner side face and its outer side face are magnetized to be different from each other. The four magnets 17 are, for example, magnetized so that inner side faces of their upper half portions are magnetized to be an "N"-pole and their outer side faces are magnetized to be an "S"-pole, and are magnetized so that inner side faces of their lower half portions are magnetized to be an "S"-pole and their outer side faces are magnetized to be an "N"-pole. Therefore, winding directions of coil wires of the first coil 31 and the second coil 32 are opposite to each other.

The spring support member 11 is a resin molded product, which is provided with a rectangular frame-shaped part 115 that is fixed to the inner side of the yoke 18 and four columnar shaped parts 119 protruding toward the imaging element side from the frame-shaped part 115. Four columnar shaped parts 119 are respectively fixed on inner sides of the corner parts of the rectangular tube-shaped body part 186 of the yoke 18. In this embodiment, as described below, the frame-shaped part 115 of the spring support member 11 is provided with a function for connecting an object side spring member My described below with the support body 2, and the columnar shaped parts 119 are provided with a function for connecting an image side spring member 14x described below with the support body 2.

The lens drive device 1 in this embodiment further includes the image side spring member 14x and the object side spring member My for connecting the support body 2 with the movable body 3 between the holder 19 and the sleeve 13 and between the spring support member 11 and the sleeve 13. Each of the image side spring member 14x and the object side spring member 14y is made of metal such as beryllium copper or SUS steel material and is formed by means of that a thin plate having a certain thickness is performed by press working or etching processing using photo lithography technique. The image side spring member 14x and the object side spring member My set the movable body 3 in a supported state by the support body 2 so as to be capable of moving along the optical axis of the lens.

The image side spring member 14x which is disposed on the holder 19 side (image side) is divided into two pieces, i.e., two spring pieces 14a and 14b. Two end parts (winding start and winding end) of the first coil 31 and the second coil 32 are electrically connected with the spring pieces 14a and 14b. Therefore, the image side spring member 14x (spring pieces 14a and 14b) functions as a power supply member to the first coil 31 and the second coil 32. The spring pieces 14a and 14b are performed with bending work to form terminals 149a and 149b.

The lens drive device 1 further includes a ring-shaped magnetic piece 130 which is held at an upper end of the sleeve 13. The magnetic piece 130 structures a magnetic spring which applies an urging force in the optical axis direction "L" to the movable body 3 by an attraction force acting between the magnets 17 and the magnetic piece 130. Therefore, since the movable body 3 is prevented from being displaced by its own weight at no energization time, the movable body 3 is capable of being held in a desired attitude and, in addition, impact resistance can be improved. Further, since the magnetic piece 130 also acts as a back yoke, leakage flux from magnetic paths structured between the magnets 17 and the first coil 31 and the second coil 32 can be reduced. A bar-like magnetic body may be used as the magnetic piece 130.

An outer peripheral face of the sleeve 13 is formed with rectangular rib-shaped protruded parts 138 and 139 at an image side end part and at an object side end part, and a rib-shaped protruded part 136 is formed at a position slightly displaced on the object to be photographed side of the intermediate position that is sandwiched by the rib-shaped protruded parts 138 and 139. In this manner, a portion for winding the first coil 31 is formed at a portion sandwiched by the rib-shaped protruded parts 136 and 138 on the outer peripheral face of the sleeve 13, and a portion for winding the second coil 32 is formed at a portion sandwiched by the rib-shaped protruded parts 136 and 139.

An upper face of the rib-shaped protruded part 139 of the sleeve 13 is formed to be a spring connecting part 13y with which the object side spring member 14y is connected and a lower end face (image side end face) of the sleeve 13 is formed to be a spring connecting part 13x with which the image side spring member 14x is connected.

Further, the image side end part of the sleeve 13 is formed with four stopper parts 135 which are protruded to the image side with respect to the spring connecting part 13x at equal angular intervals. The stopper part 135 is interfered with the holder 19 in a recessed part 191a of the holder 19 to restrict a moving range to the image side of the movable body 3 and its turning range.

Figure 4A:
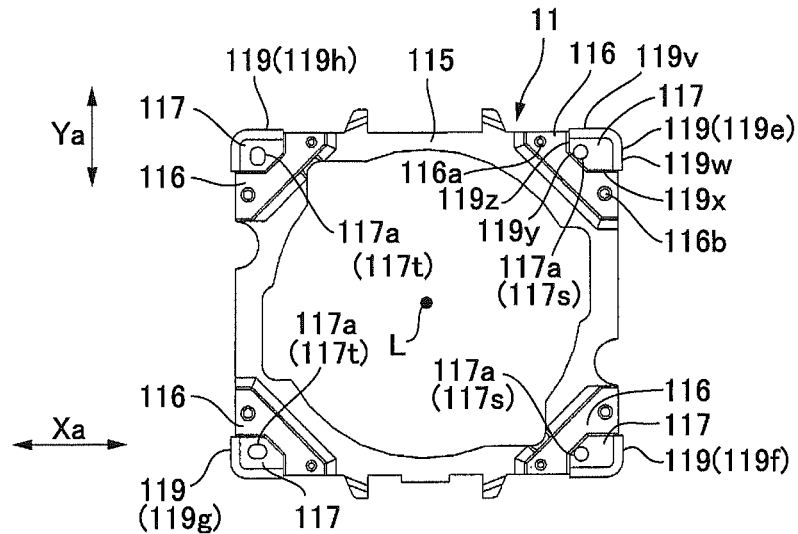
FIG. 4(a) is a bottom view showing a spring support member.
Figure 4B:
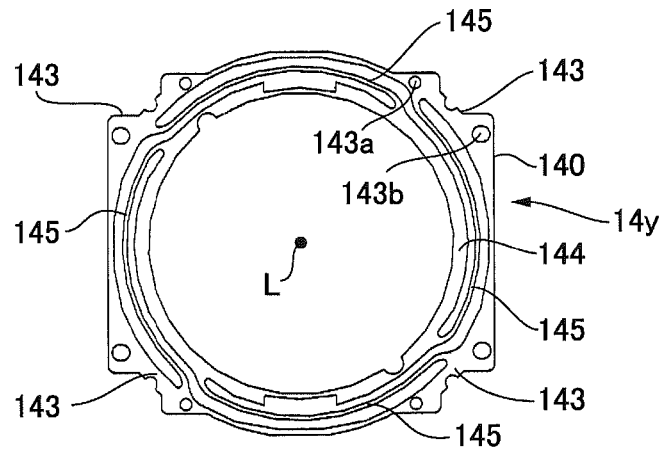
FIG. 4(b) is a bottom view showing a second spring member.
Figure 4C:
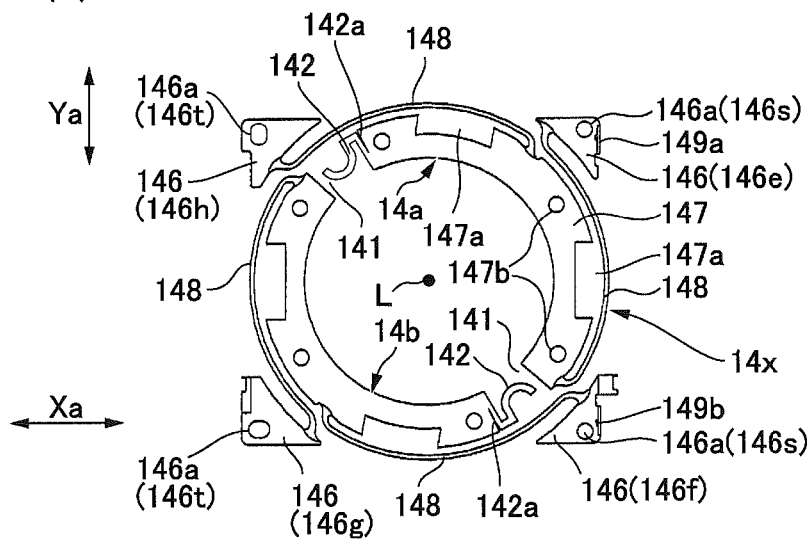
FIG. 4(c) is a bottom view showing a first spring member, all of which are used in a lens drive device in accordance with an embodiment of the present invention.

FIG. 4(a) is a bottom view showing a spring support member, FIG. 4(b) is a bottom view showing a second spring member, and FIG. 4(c) is a bottom view showing a first spring member, all of which are used in a lens drive device in accordance with an embodiment of the present invention.

A structure of a spring member (the image side spring member 14x and the object side spring member 14y) which is used in the lens drive device in accordance with an embodiment of the present invention will be described below with reference to FIG. 1(a) through FIG. 4(c).

As shown in FIG. 1(a) through FIG. 3(b), in order to connect the image side spring member 14x and the object side spring member 14y with the movable body 3, in this embodiment, the image side spring member 14x and the object side spring member 14y are connected with the sleeve 13.

As shown in FIGS. 3(a) and 3(b) and FIG. 4(b), the object side spring member 14y is provided with an outer frame-shaped part 140 having four fixed side connecting parts 143 at its corner portions which are held by the support body 2, a movable side connecting part 144 which is formed in a circular-ring frame shape and connected with the upper end of the sleeve 13, and four arm parts 145 which connect the fixed side connecting parts 143 with the movable side connecting part 144. Each of four arm parts 145 is substantially extended in a circular arc shape from a connected portion with the movable side connecting part 144 to reach to the fixed side connecting part 143. The movable side connecting part 144 is formed with cut-out parts for connecting with the spring connecting part 13y of the sleeve 13, and adhesion or the like of the movable side connecting part 144 to the spring connecting part 13y is performed by utilizing the cut-out parts. Further, each of four fixed side connecting parts 143 is formed with two holes 143a and 143b for connecting with the spring support member 11. In this embodiment, the holes 143a and 143b are formed at positions displaced in an angular direction and the hole 143b is slightly larger than the hole 143a. The fixed side connecting part 143 is fixed to a root portion of the columnar shaped part 119 on an under face of the frame-shaped part 115 of the spring support member 11 described below. Therefore, an outer circumferential edge of the fixed side connecting part 143 is recessed so as to avoid the columnar shaped part 119.

As shown in FIGS. 3(a) and 3(b) and FIG. 4(c), the image side spring member 14x is provided with four fixed side connecting parts 146 which are held by the support body 2, a movable side connecting part 147 which is formed in a circular-ring frame shape and connected with the lower end of the sleeve 13, and four arm parts 148 which connect the fixed side connecting parts 146 with the movable side connecting part 147. Each of four arm parts 148 is substantially extended in a circular arc shape from a connected portion with the movable side connecting part 147 to reach to the fixed side connecting part 146. The movable side connecting part 147 is formed with cut-out parts 147a and holes 147b for connecting with the lower end face (spring connecting part 13x) of the sleeve 13, and positioning, adhesion or the like of the movable side connecting part 147 to the spring connecting part 13x is performed by utilizing the cut-out parts 147a and the holes 147b. Further, each of four fixed side connecting parts 146 is formed with a hole 146a for connecting with the holder 19.

In this embodiment, the image side spring member 14x is divided into two spring pieces 14a and 14b through two cut-out portions 141 provided in the movable side connecting part 147. The spring pieces 14a and 14b are utilized as power supply members to the first coil 31 and the second coil 32. Therefore, both end parts (winding start part and winding end part) of one coil wire which structures the first coil 31 and the second coil 32 are connected with two spring pieces 14a and 14b by a method such as soldering. In this embodiment, in a stage of a predetermined manufacturing step, the image side spring member 14x is structured so that the spring pieces 14a and 14b are connected with each other through a frame-shaped part (not shown) and the spring member 14x is divided into two spring pieces 14a and 14b during assembling to the lens drive device 1.

In the image side spring member 14x in this embodiment, a coil connecting terminal part 142 of the spring piece 14a, which is formed so that a width of an end part of the movable side connecting part 147 made of a thin plate is formed thinner so as to be capable of being resiliently bent to an inner side in the radial direction, is formed in one of two cut-out portions 141 which are end parts in the circumferential direction of the movable side connecting part 147. Further, a coil connecting terminal part 142 of the spring piece 14b is similarly formed in the other of two cut-out portions 141. A utilizing method and the like of the coil connecting terminal parts 142 will be described below.

Figure 5A:
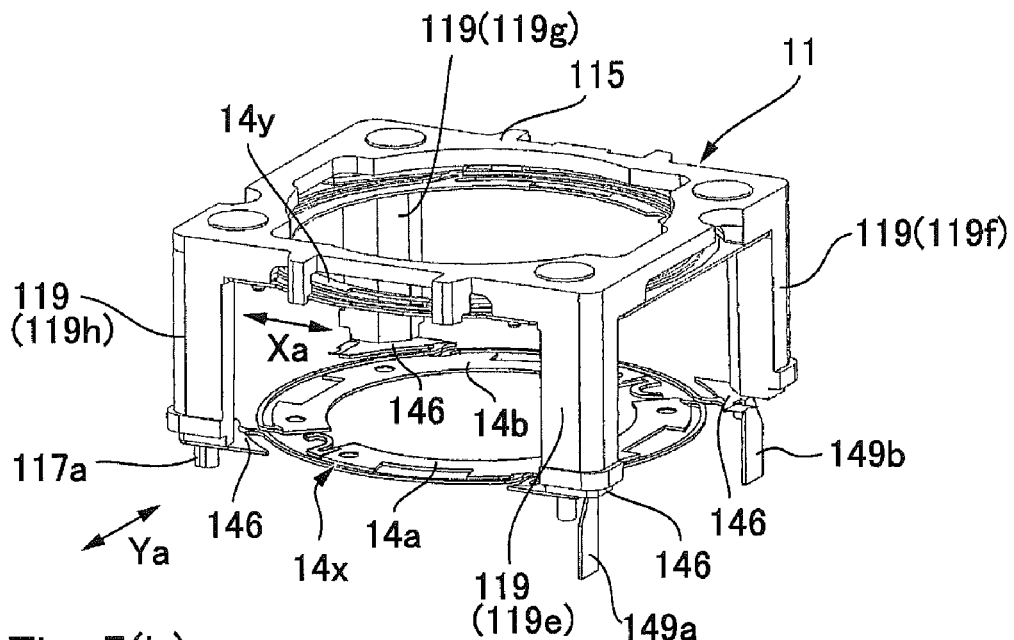
FIGS. 5(a) and 5(b) are explanatory perspective views showing states where a first spring member and a second spring member are held by a common spring support member in a lens drive device in accordance with an embodiment of the present invention.
Figure 5B:
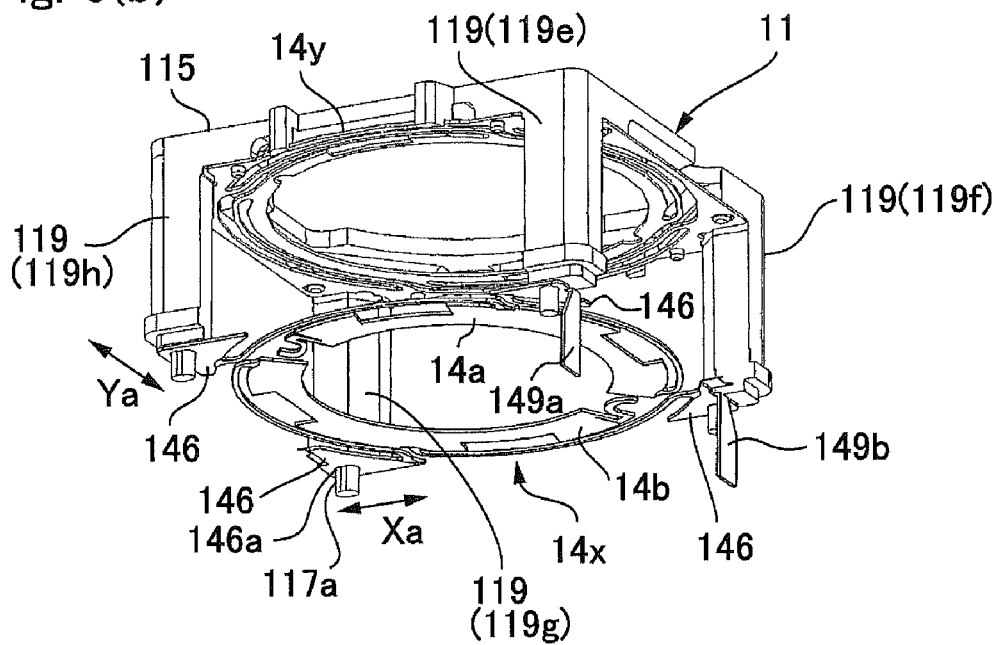

FIGS. 5(a) and 5(b) are explanatory perspective views showing states where the object side spring member and the image side spring member are held by a common spring support member in a lens drive device in accordance with an embodiment of the present invention. FIG. 5(a) is a perspective view which is viewed from the object to be photographed side and FIG. 5(b) is a perspective view which is viewed from the imaging element side.

As shown in FIG. 1(a) through FIG. 5(b), in this embodiment, in order to connect the image side spring member 14x and the object side spring member 14 y with the support body 2, as shown in FIGS. 5(a) and 5(b), the image side spring member 14x and the object side spring member 14 y are connected with the spring support member 11.

In FIGS. 4(a) and 4(b) and FIGS. 5(a) and 5(b), the spring support member 11 is a resin molded product which is provided with a rectangular frame-shaped part 115 and four columnar shaped parts 119 protruding toward the imaging element side from the frame-shaped part 115. A portion of the frame-shaped part 115 in the vicinity of a root part of the columnar shaped part 119 is formed as a connection part 116 with the object side spring member 14 y. In other words, two protruded parts 116a and 116b which are fitted to two holes 143a and 143b of the object side spring member 14 y are formed in the vicinity of the root part of the columnar shaped part 119 in the frame-shaped part 115. The protruded parts 116a and 116b are, similarly to the holes 143a and 143b, formed at different positions from each other in the angular direction. Therefore, when the fixed side connecting part 143 of the object side spring member 14 y is superposed on the connection part 116 of the spring support member 11, the protruded parts 116a and 116b are fitted into the holes 143a and 143b of the object side spring member 14 y and thus the angular position of the object side spring member 14 y to the spring support member 11 is determined. In this state, when adhesion or welding are performed around the protruded parts 116a and 116b, the fixed side connecting part 143 of the object side spring member 14y is connected with the connection part 116 of the spring support member 11.

In this embodiment, the fixed side connecting part 143 of the object side spring member 14y is formed at four positions around the lens optical axis "L". Among four fixed side connecting parts 143, two fixed side connecting parts 143 facing each other across the lens optical axis "L" are located at point-symmetrical positions with the lens optical axis as its center, and the other two fixed side connecting parts 143 facing each other across the lens optical axis "L" is also located at point-symmetrical positions with the lens optical axis at its center. Further, the connection part 116 of the spring support member 11 is formed with four positions around the lens optical axis "L" and, among four connection parts 116, two connection parts 116 facing each other across the lens optical axis "L" are located at point-symmetrical positions with the lens optical axis as its center, and the other two connection parts 116 facing each other across the lens optical axis "L" is located at point-symmetrical positions with the lens optical axis as its center. Therefore, in this embodiment, the object side spring member 14y and the spring support member 11 are connected with each other at four positions around the lens optical axis "L" and, among four positions, two positions facing each other across the lens optical axis "L" are located at point-symmetrical positions with the lens optical axis as its center and the other two positions facing each other across the lens optical axis are located at point-symmetrical positions with the lens optical axis as its center.

As shown in FIGS. 4(*a*) and 4(*c*) and FIGS. 5(*a*) and 5(*b*), each of the tip end parts 117 of four columnar shaped parts 119 of the spring support member 11 is a connection part with the image side spring member 14x. In other words, the tip end part 117 of the columnar shaped part 119 is formed with a protruded part 117a which is fitted into the hole 146a of the image side spring member 14x.

In this embodiment, the holes 146a formed in two fixed side connecting parts 146e and 146f which are adjacent to each other in the circumferential direction of the image side spring member 14x are holes 146s having a substantially complete round shape but the holes 146a formed in the other two fixed side connecting parts 146g and 146h are holes 146t having an elliptical shape. Further, the hole 146a (hole 146t having an elliptical shape) formed in the fixed side connecting part 146g and the hole 146a (hole 146t having an elliptical shape) formed in the fixed side connecting part 146h are formed so that their longer axes are directed in orthogonal directions to each other. Further, in the protruded parts 117a formed at the tip end parts 117 of four columnar shaped parts 119 (columnar shaped parts 119e, 119f, 119g and 119h) of the spring support member 11, the protruded parts 117a formed at the tip end parts 117 of two columnar shaped parts 119e and 119f which are adjacent to each other in the circumferential direction are protruded parts 117s whose cross section is a substantially complete round shape, and the dimensions of the protruded parts 117a are substantially the same dimensions as the holes 146a (holes 146s having a substantially complete round shape) which are formed in the fixed side connecting parts 146e and 146f. On the other hand, the protruded parts 117a formed at the tip end parts 117 of the other two columnar shaped parts 119g and 119h are protruded parts 117t whose cross sections are in a substantially elliptical shape. Further, the protruded parts 117a (protruded parts 117t whose cross sections are in a substantially elliptical shape) which are formed at the tip end parts 117 of the columnar shaped parts 119g and 119h are formed so that their longer axes are directed in orthogonal directions to each other similarly to the holes 146a (holes 146t having an elliptical shape) which are formed in the fixed side connecting parts 146g and 146h.

In this embodiment, dimensions in the shorter axis direction of protruded parts 117a (protruded parts 117t whose cross sections are in a substantially elliptical shape) which are formed at the tip end parts 117 of the columnar shaped parts 119g and 119h are substantially the same dimensions in the shorter axis direction of the holes 146a (holes 146t having an elliptical shape) which are formed in the fixed side connecting parts 146g and 146h. However, dimensions in the longer axis direction of the protruded parts 117a (protruded parts 117t whose cross section is a substantially elliptical shape) which are formed at the tip end parts 117 of the columnar shaped parts 119g and 119h are set to be smaller than the dimensions in the longer axis direction of the holes 146a (holes 146t having an elliptical shape) which are formed in the fixed side connecting parts 146g and 146h. Therefore, there is a space for rattling in the longer axis direction as shown by the arrow "Xa" between the protruded part 117a (protruded part 117t whose cross section is in a substantially elliptical shape) which is formed at the tip end part 117 of the columnar shaped part 119g and the hole 146a (hole 146t having an elliptical shape) which is formed in the fixed side connecting part 146g. Further, there is a space for rattling in the longer axis direction as shown by the arrow "Ya" between the protruded part 117a (protruded part 117t whose cross section is in a substantially elliptical shape) which is formed at the tip end part 117 of the columnar shaped part 119h and the hole 146a (hole 146t having an elliptical shape) which is formed in the fixed side connecting part 146h.

In this embodiment, the holes 146a formed in two fixed side connecting parts 146g and 146h adjacent to each other in the circumferential direction are formed in an elliptical holes 146t. However, positions for rattling may be changed. For example, the holes 146a formed in two fixing side connecting parts 146e and 146g facing each other across the lens optical axis "L" may be the holes 146t having an elliptical shape and the holes 146a formed in the other two fixed side connecting parts 146f and 146h may be the holes 146s having a complete round shape.

Also in the spring support member 11 and the image side spring member 14x structured as described above, when the fixed side connecting parts 146 of the image side spring member 14x are superposed on the tip end parts 117 of the spring support member 11, the protruded parts 117a are fitted into the holes 146a of the image side spring member 14x. In this case, there are spaces for rattling in the longer axis direction between the protruded parts 117a (protruded parts 117t whose cross section is in a substantially elliptical shape) which are formed at the tip end parts 117 of the columnar shaped parts 119g and 119h and the holes 146a (holes 146t having an elliptical shape) which are formed in the fixed side connecting parts 146g and 146h. On the other hand, there are no spaces for rattling in the shorter axis direction between the protruded parts 117a (protruded parts 117t whose cross section is in a substantially elliptical shape) which are formed at the tip end parts 117 of the columnar shaped parts 119g and 119h and the holes 146a (holes 146t having an elliptical shape) which are formed in the fixed side connecting parts 146g and 146h. In addition, there are no spaces for rattling between the protruded parts 117a which are formed at the tip end parts 117 of the columnar shaped parts 119e and 119f and the holes 146a (holes 146s having a substantially complete round shape) which are formed in the fixed side connecting parts 146e and 146f. Therefore, when the protruded parts 117a are fitted into the holes 146a, angular position between the image side spring member 14x and the spring support member 11 is determined. Accordingly, when adhesion or welding is performed around the protruded parts 117a, the fixed side connecting parts 146 of the image side spring member 14x and the tip end parts 117 of the columnar shaped parts 119 of the spring support member 11 are connected with each other.

In this embodiment, the fixed side connecting part 146 of the image side spring member 14x is formed at four positions around the lens optical axis "L" and, among four fixed side connecting parts 146, two fixed side connecting parts 146 facing each other across the lens optical axis "L" are located at point-symmetrical positions with the lens optical axis as its center, and the other two fixed side connecting parts 146 facing each other across the lens optical axis "L" are also located at point-symmetrical positions with the lens optical axis as its center. Further, the columnar shaped part 119 of the spring support member 11 is formed at four positions around the lens optical axis "L" and, among four columnar shaped parts 119, two columnar shaped parts 119 facing each other across the lens optical axis "L" are located at point-symmetrical positions with the lens optical axis as its center, and the other two columnar shaped parts 119 facing each other across the lens optical axis "L" are located at point-symmetrical positions with the lens optical axis as its center. Therefore, in this embodiment, the image side spring member 14x and the spring support member 11 are connected at four positions around the lens optical axis "L" and, among the four positions, two positions facing each other across the lens optical axis "L" are located at point-symmetrical positions with the lens optical axis as its center, and the other two positions facing each other across the lens optical axis are located at point-symmetrical positions with the lens optical axis as its center.

Further, in the spring support member 11, the connected portions (columnar shaped parts 119) of the image side spring member 14x with the spring support member 11 and the connected portions (connection parts 116) of the object side spring member 14y with the spring support member 11 are located at the same angular directions as each other when viewed from the lens optical axis "L" and they are basically superposed on each other in the lens optical axis "L" direction.

Figure 6A:
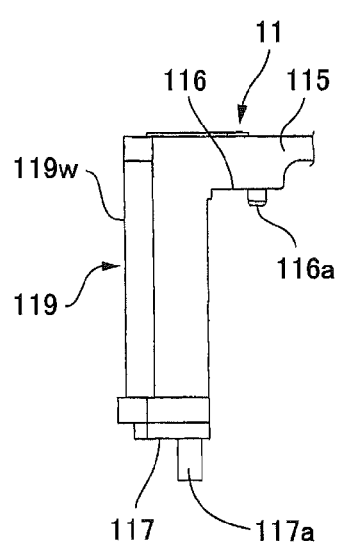
FIGS. 6(a), 6(b) and 6(c) are explanatory views showing a columnar shaped part of a spring support member which is used in a lens drive device in accordance with an embodiment of the present invention.
Figure 6B:
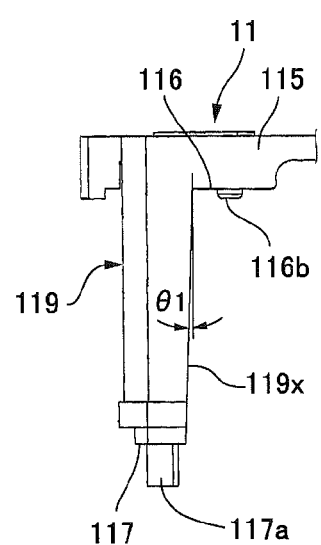
Figure 6C:
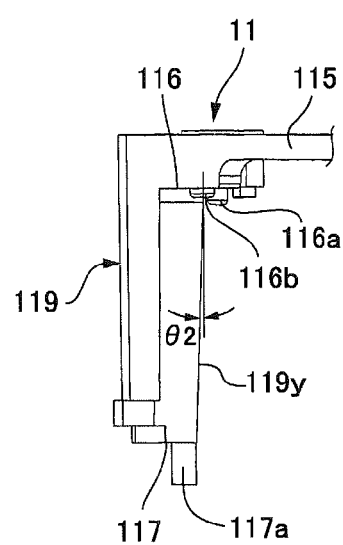

FIGS. 6(a), 6(b) and 6(c) are explanatory views showing a columnar shaped part of the spring support member which is used in the lens drive device in accordance with an embodiment of the present invention. FIG. 6(a) is a side view showing an outer side face of a columnar shaped part, FIG. 6(b) is a side view showing a first side face on an inner side of the columnar shaped part, and FIG. 6(c) is a side view showing a second side face on an inner side of the columnar shaped part.

As shown in FIG. 4(a) and FIGS. 5(a) and 5(b), each of four columnar shaped parts 119 of the spring support member 11 is provided with two outer side faces 119v and 119w and three inner side faces 119x, 119y and 119z. In this embodiment, each of the outer side faces 119w of four columnar shaped parts 119 is extended in parallel to the lens optical axis "L" as shown in FIG. 6(a). Further, similarly to the side faces 119w, each of the outer side faces 119v is also extended in parallel to the lens optical axis "L".

On the other hand, the inner side face 119x is formed in a tapered face which is slantingly extended by an angle "Θ1" so as to be made thinner toward the tip end side of the columnar shaped part 119 as shown in FIG. 6(b) Similarly to the inner side face 119x, the inner side face 119z is formed in a tapered face which is slantingly extended so as to be made thinner toward the tip end side of the columnar shaped part 119. In addition, similarly to the inner side faces 119x and 119z, as shown in FIG. 6(c), the inner side face 119y is formed in a tapered face which is slantingly extended by an angle "Θ2" so as to be made thinner toward the tip end side of the columnar shaped part 119. In this embodiment, inclinations of the side faces 119x, 119y and 119z (angles "Θ1" and "Θ2") are about 5° (5 degree).

Figure 7A:
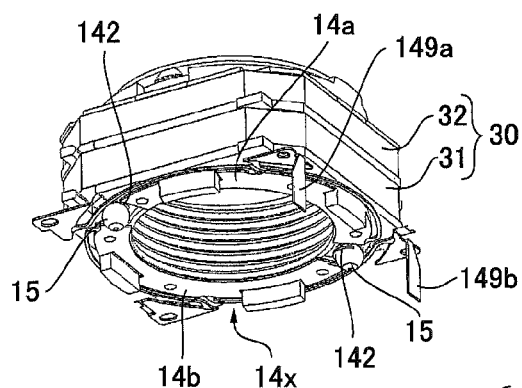
FIGS. 7(a), 7(b) and 7(c) are explanatory perspective views showing an electrical connection structure between a coil end and the spring member at an end part on an imaging element side of a movable body in a lens drive device in accordance with an embodiment of the present invention.
Figure 7C:
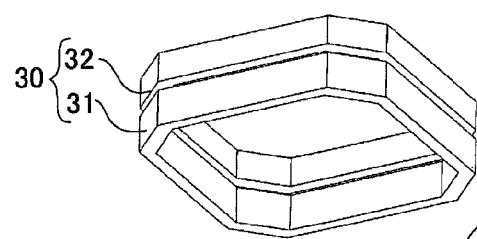
Figure 7B:
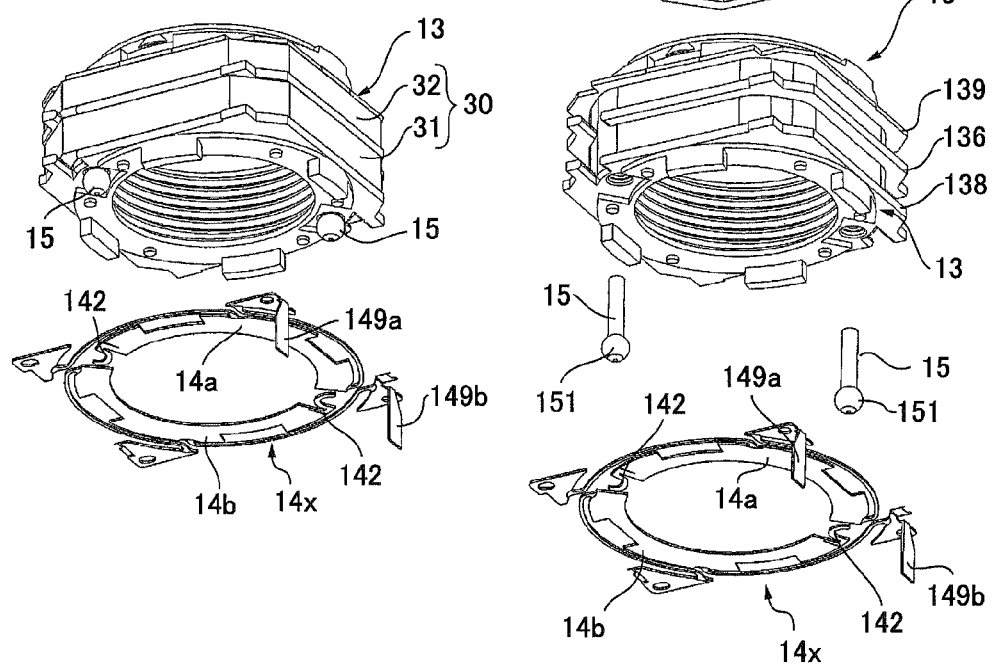
Figure 8A:
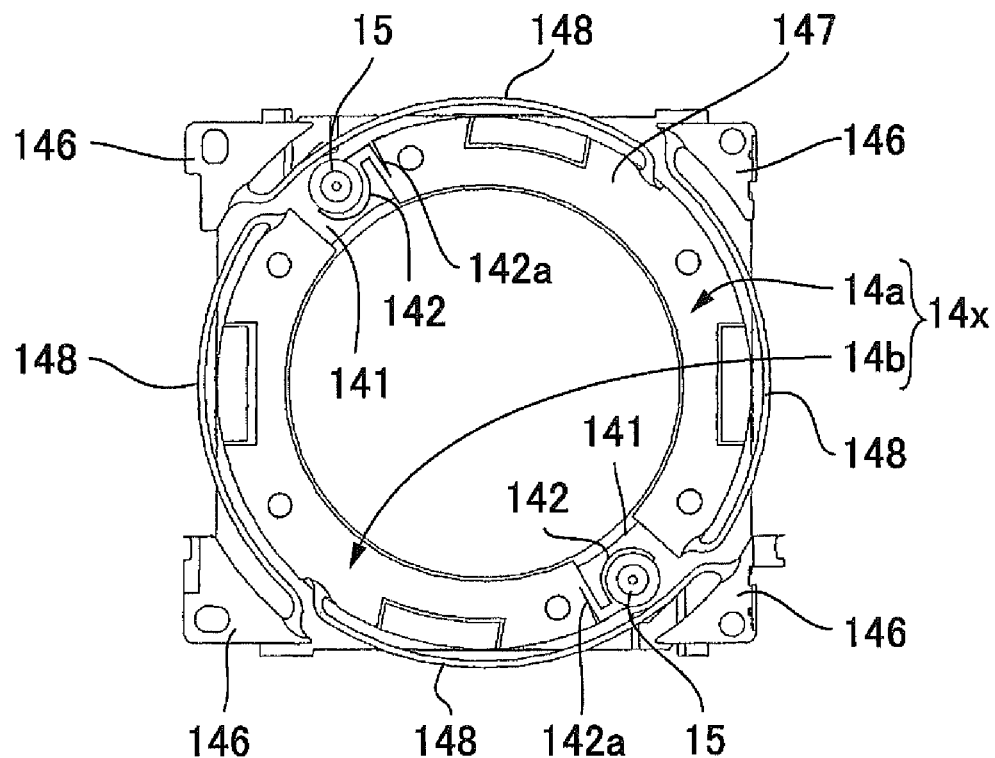
FIG. 8(a) is a bottom view showing an electrical connection structure between a coil end and a spring member at an end part on an imaging element side of a movable body in a lens drive device in accordance with an embodiment of the present invention.
Figure 8B:
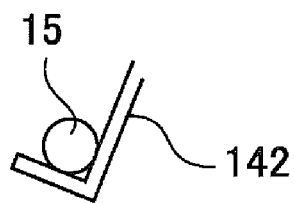
FIG. 8(b) is an explanatory view showing a coil connecting terminal part which is formed in a "V" shape and FIG. 8(c) is an explanatory view showing a coil connecting terminal part which is formed in a "Y" shape.
Figure 8C:
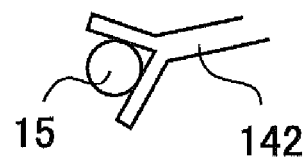
Figure 9:
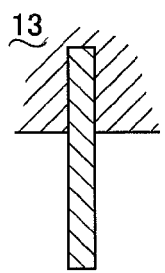
FIGS. 9(a1) through 9(a4) and FIGS. 9(b1) through 9(b4) are explanatory views showing steps through which a coil end and a spring member are electrically connected with each other at an end part on an imaging element side of a movable body in a lens drive device in accordance with an embodiment of the present invention.
Figure 9:
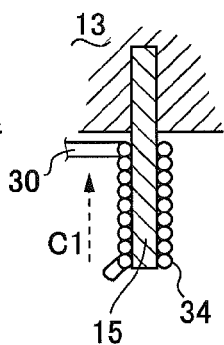
Figure 9:
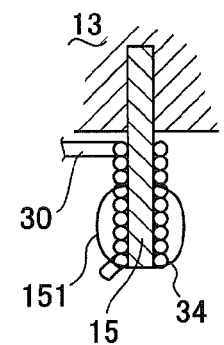
Figure 9:
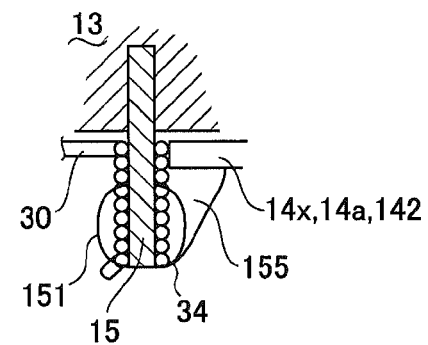
Figure 9:
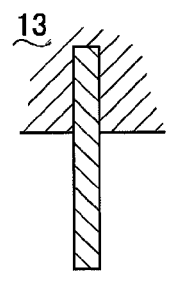
Figure 9:
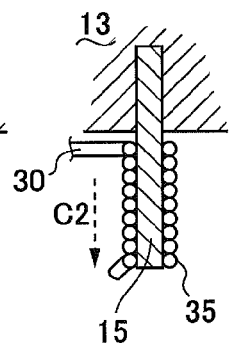
Figure 9:
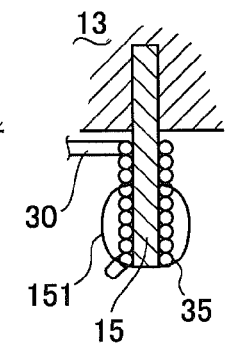
Figure 9:
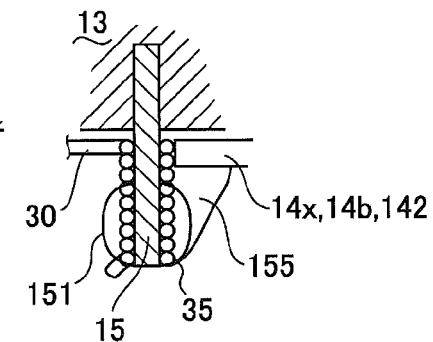

FIGS. 7(a), 7(b) and 7(c) are explanatory perspective views showing an electrical connection structure between coil ends and a spring member at an end part on the imaging element side of the movable body in the lens drive device in accordance with an embodiment of the present invention. FIG. 7(a) is a perspective view showing an end part on the imaging element side of the movable body, FIG. 7(b) is a perspective view showing a state where a first spring member is detached from the movable body, and FIG. 7(c) is a perspective view showing a state where binding pins and the first spring member are detached from the movable body. FIG. 8(a) is a bottom view showing an electrical connection structure between a coil end and a spring member at an end part on the imaging element side of the movable body in the lens drive device in accordance with an embodiment of the present invention. FIG. 8(b) is an explanatory view showing a coil connecting terminal part 142 which is formed in a "V" shape and FIG. 8(c) is an explanatory view showing a coil connecting terminal part 142 which is formed in a "Y" shape. FIGS. 9(a1) through 9(a4) and FIGS. 9(b1) through 9(b4) are explanatory views showing steps through which a coil end and a spring member are electrically connected with each other at an end part on the imaging element side of the movable body in the lens drive device in accordance with an embodiment of the present invention.

In this embodiment, in order to electrically connect the spring pieces 14a and 14b described with reference to FIG. 2 through FIG. 5(b) with both end parts (a coil end of winding start and a coil end of winding end) of one coil wire structuring the first coil 31 and the second coil 32, as shown in FIGS. 7(a), 7(b) and 7(c), two binding pins 15 which are held in the end face on the image side of the sleeve 13 are utilized. In other words, the coil ends which are wound around the binding pins 15 and two coil connecting terminal parts 142 of the spring pieces 14a and 14b of the image side spring member 14x are electrically connected with each other by a method such as soldering, electro-conductive adhesive or welding.

The binding pin 15 may be made of heat-resistant resin or metal and, in this embodiment, the binding pin 15 is made of metal. Further, in order to integrate the binding pin 15 with the sleeve 13, a method may be adopted in which a binding pin 15 is insert-molded at the time of resin molding of the sleeve 13, or a method may be adopted in which a binding pin 15 is press-fitted into a hole which is formed in the sleeve 13. In this embodiment, a binding pin 15 is press-fitted into a hole which is formed in the sleeve 13. Further, the binding pin 15 is provided at an end part on the image side with a spherical protruding portion 151, which is a deformed portion by laser heating performed on the binding pin 15.

As shown in FIG. 4(c) and FIG. 8(a), two coil connecting terminal parts 142 formed in the spring pieces 14a and 14b of the image side spring member 14x are respectively bent so as to be along a periphery of the binding pin 15 and formed in a "C" shape whose opening portion of the "C" shape is directed toward an outer side in the radial direction. In addition, a root portion of the coil connecting terminal part 142 is formed with a slit 142a as a cut-out part from an outer side in the radial direction toward an inner side in the radial direction so that the coil connecting terminal part 142 is capable of easily resiliently deformed. Therefore, the coil connecting terminal part 142 is provided with elasticity which is capable of being resiliently deformed when the coil connecting terminal part 142 is abutted with a coil end wound around the binding pin 15. In accordance with an embodiment of the present invention, the slit 142a may be formed in a shape which allows easy elastic deformation of the coil connecting terminal part 142 and, when the coil connecting terminal part 142 formed in a "C"-shape is provided with a sufficient elasticity for resilient deformation, no slit 142a may be formed. Further, in accordance with an embodiment of the present invention, as an example where the coil connecting terminal part 142 is bent so as to be along the periphery of the binding pin 15, in addition to the above-mentioned "C" shape, the coil connecting terminal part 142 may be formed in a "V" shape as shown in FIG. 8(b) or formed in a "Y" shape as shown in FIG. 8(c).

Next, an electric connection method of coil ends with the spring pieces 14a and 14b of the image side spring member 14x will be described below with reference to FIGS. 9(a1) through 9(a4) and FIGS. 9(b1) through 9(b4).

In this embodiment, as shown in FIGS. 9(a1) and 9(b1), the binding pin 15 has been previously held in the sleeve 13 by a method such as press-fitting. Next, as shown in FIG. 9(a2), a coil end 34 of winding start of a coil wire 30 is wound around the binding pin 15 in, for example, 7-9 (seven through nine) turns. In this case, for example, as shown by the arrow "C1" in FIG. 9(a2), the coil end 34 is wound from a tip end part of the binding pin 15 toward its root part.

Next, after the coil wire 30 has been wound around the sleeve 13 to form the first coil 31 and the second coil 32, as shown in FIG. 9(b2), the coil end 35 of winding end is wound around the binding pin 15 in, for example, 7-9 turns. In this case, for example, as shown by the arrow "C2" in FIG. 9(b2), the coil end 34 is wound from a root part of the binding pin 15 toward its tip end.

Next, as shown in FIGS. 9(a3) and 9(b3), laser beams are irradiated to the tip ends of the binding pins 15 and thus insulation coating layers are removed from surfaces of the coil ends 34 and 35 and the tip ends of the binding pins 15 are melted to be deformed. As a result, spherical protruding portions 151 are formed at the tip ends of the binding pins 15. In this case, a melting operation by a laser beam is performed on only a part (for example, 5-6 (five or six) turns) of the coil end 34 of winding start on a winding start side around the binding pin 15, and on only a part (for example, 5-6 (five or six) turns) of the coil end 35 of winding end on a winding end side around the binding pin 15. Therefore, a melting operation by a laser beam is not performed on remaining winding portions (two or three turns) of the coil ends 34 and 35.

Next, as shown in FIG. 7(a) and FIG. 8(a), the image side spring member 14x(spring pieces 14a and 14b) is connected with the end part of the sleeve 13. As a result, the coil connecting terminal parts 142 of the spring pieces 14a and 14b are located in the vicinities of the binding pins 15.

After that, as shown in FIGS. 9(a4) and 9(b4), two coil connecting terminal parts 142 of the spring pieces 14a and 14b of the image side spring member 14x and the tip end sides of the binding pins 15 are electrically connected with each other by using electro-conductive adhesive 155 or the like. As a result, the coil ends 34 and 35 wound around the binding pins 15 and two coil connecting terminal parts 142 of the spring pieces 14a and 14b of the image side spring member 14x are electrically connected with each other through the electro-conductive adhesive 155.

Figure 10:
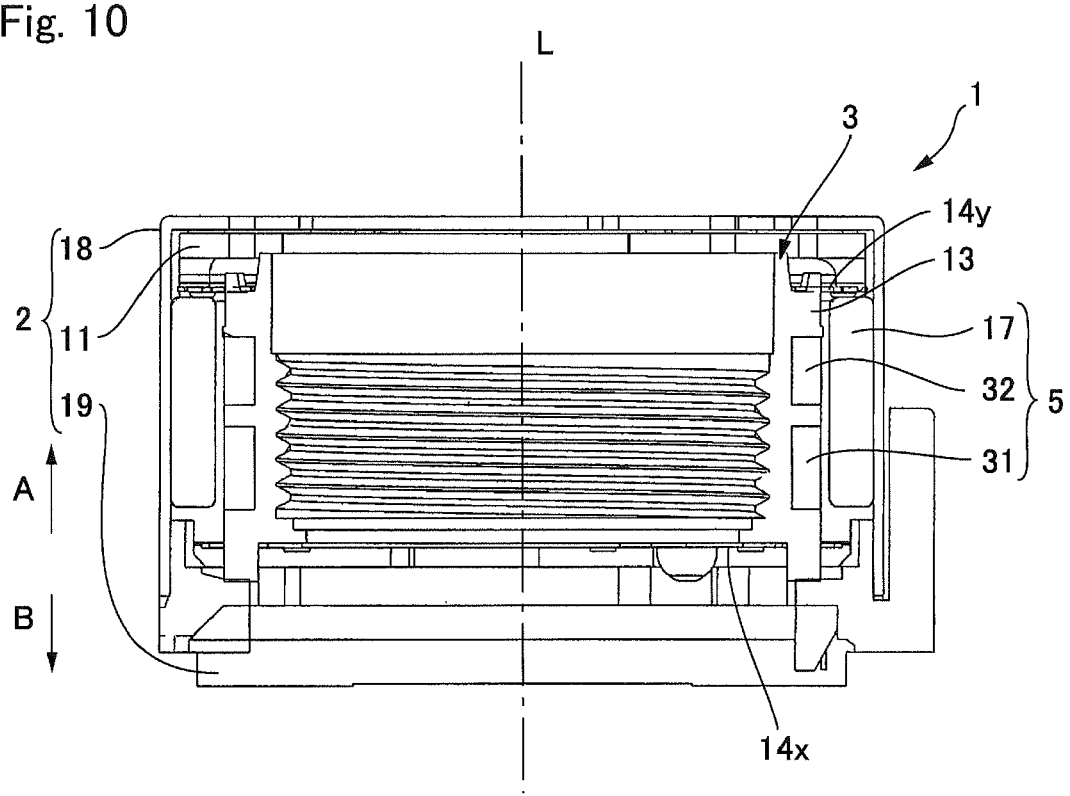
FIG. 10 is a cross-sectional view showing a lens drive device in accordance with an embodiment of the present invention which is cut along a lens optical axis.

FIG. 10 is a cross-sectional view showing the lens drive device in accordance with an embodiment of the present invention which is cut along the lens optical axis. In FIG. 10, the lens drive device 1 in this embodiment is in a waiting state where energization to the first coil 31 and the second coil 32 is stopped so that the magnetic drive mechanism 5 is stopped. In this state, the movable body 3 is located on the image side by urging forces of the image side spring member 14x and the object side spring member 14 y and thus the image side end part of the sleeve 13 is elastically abutted with the holder 19.

In this state, when an electric current is supplied to the first coil 31 and the second coil 32 in a predetermined direction, upward (front side) electro-magnetic forces are respectively applied to the first coil 31 and the second coil 32. As a result, the sleeve 13 to which the first coil 31 and the second coil 32 are fixed begins to move toward the object to be photographed side (front side/direction shown by the arrow "A"). In this case, elastic forces for restricting movement of the sleeve 13 are respectively generated between the object side spring member 14 y and the front end of the sleeve 13 and between the image side spring member 14x and the rear end of the sleeve 13. Therefore, when the electro-magnetic force which moves the sleeve 13 to the front side and the elastic force which restricts movement of the sleeve 13 are balanced with each other, the sleeve 13 is stopped. In this case, when an amount of an electric current which is supplied to the first coil 31 and the second coil 32 is adjusted depending on an elastic force acting on the sleeve 13 by the image side spring member 14x and the object side spring member 14 y, the sleeve 13 (movable body 3) can be stopped at a desired position.

In this embodiment, a flat spring (gimbal spring) in which linear relationship is satisfied between its elastic force (stress) and its displacement amount (distortion amount) is utilized as the image side spring member 14x and the object side spring member 14 y. Therefore, linearity between a moving amount of the sleeve 13 and a current supplied to the first coil 31 and the second coil 32 is improved. Further, two spring members, i.e., the image side spring member 14x and the object side spring member 14 y are used and thus large balanced forces are applied to each other in the optical axis direction when the sleeve 13 is stopped. Therefore, even when another force such as a centrifugal force or an impact force is applied in the optical axis direction, the sleeve 13 is stopped stably. In addition, in the lens drive device 1, the sleeve 13 is stopped by utilizing balanced forces between an electro-magnetic force and an elastic force instead of colliding with a collided member (buffer member) and thus occurrence of a collision noise is prevented.

As described above, in the lens drive device 1 in this embodiment, the image side spring member 14x (first spring member), which is connected with one side end part of the movable body 3 and the support body 2, and the object side spring member 14 y (second spring member) which is connected with the other side end part of the movable body 3 and the support body 2 are connected with a common spring support member 11 which structures the support body 2. Therefore, when the lens drive device 1 is to be assembled, the following assembling method may be adopted and assembling steps are easy. First, after the object side spring member 14 y is fixed to the spring support member 11, the spring support member 11 is fixed to the yoke 18 and next, the magnets 17 are fixed to the yoke 18. In this case, the magnets 17 are positioned by the spring support member 11. Next, the object side spring member 14 y is fixed to the sleeve 13 around which the first coil 31 and the second coil 32 are wound. Next, the image side spring member 14x and the sleeve 13 are connected with each other. After that, the spring support member 11 and the holder 19 are connected with each other by utilizing the protruded parts 117*a* of the columnar shaped parts 119 of the spring support member 11.

Further, in this embodiment, since the image side spring member 14*x* and the object side spring member 14*y* are connected with each other through the common spring support member 11, positional displacement between the image side spring member 14*x* and the object side spring member 14*y* is hard to be occurred. Therefore, occurrence of malfunctions can be prevented in which the optical axis of the lens 36 held by the movable body 3 is inclined with respect to the device optical axis, or in which the optical axis of the lens 36 and the device optical axis are displaced from each other.

Further, the object side spring member 14*y* and the image side spring member 14*x* and the spring support member 11 are connected with each other at four positions around the lens optical axis "L" and, among four positions, two positions facing across the lens optical axis "L" are located at point-symmetrical positions with the lens optical axis as its center, and the other two positions facing across the lens optical axis are also located at point-symmetrical positions with the lens optical axis as its center. Therefore, the movable body 3 is hard to be inclined. Further, the connected positions of the object side spring member 14*y* and the spring support member 11 and the connected positions of the image side spring member 14*x* and the spring support member 11 are located at the same angular directions with the lens optical axis "L" as its center and thus the movable body 3 is further hard to be inclined.

Further, the spring support member 11 is provided with the frame-shaped part 115 and four columnar shaped parts 119 which are extended from the frame-shaped part 115 in the same direction as the lens optical axis direction "L". The object side spring member 14*y* is connected to portions corresponding to the root parts of the columnar shaped parts and the image side spring member 14*x* is connected with the tip end parts of the columnar shaped parts 119. Therefore, even when the image side spring member 14*x* and the object side spring member 14*y* are separated from each other in the lens optical axis "L" direction, the image side spring member 14*x* and the object side spring member 14*y* are connected with the common spring support member 11.

Further, when the fixed side connecting parts 143 of the object side spring member 14*y* are superposed on the connection parts 116 of the spring support member 11, the protruded parts 116*a* and 116*b* are fitted into the holes 143*a* and 143*b* of the object side spring member 14*y*. Further, when the fixed side connecting parts 146 of the image side spring member 14*x* are superposed on the tip end parts 117 of the spring support member 11, the protruded parts 117*a* are fitted into the holes 146*a* of the image side spring member 14*x*. Therefore, the image side spring member 14*x* and the object side spring member 14*y* can be connected with the common spring support member 11 with a high degree of positional accuracy.

In addition, two protruded parts 116*a* and 116*b* are fitted into two holes 143*a* and 143*b* in the connection parts of the object side spring member 14*y* and the spring support member 11 and thus the object side spring member 14*y* can be connected with the spring support member 11 with a high degree of positional accuracy. On the other hand, in the connection part of the image side spring member 14*x* and the spring support member 11, there are spaces for rattling in the longer axis direction between the protruded parts 117*a* (protruded parts 117*t* whose cross section is a substantially elliptical shape), which are formed in the tip end parts 117 of the columnar shaped parts 119*g* and 119*h*, and the holes 146*a* (holes 146*t* having an elliptical shape) which are formed in the fixed side connecting parts 146*g* and 146*h*. Further, there are no spaces for rattling in the shorter axis direction between the protruded parts 117*a* (protruded parts 117*t* whose cross section is a substantially elliptical shape), which are formed in the tip end parts 117 of the columnar shaped parts 119*g* and 119*h*, and the holes 146*a* (holes 146*t* having an elliptical shape) which are formed in the fixed side connecting parts 146*g* and 146*h*. In addition, there are no spaces for rattling between the protruded parts 117*a* which are formed in the tip end parts 117 of the columnar shaped parts 119*e* and 119*f* and the holes 146*a* (holes 146*s* having a substantially complete round shape) which are formed in the fixed side connecting parts 146*e* and 146*f*. Further, the directions of rattling between the protruded parts 117*a* (protruded parts 117*t* whose cross section is a substantially elliptical shape), which are formed in the tip end parts 117 of the columnar shaped parts 119*g* and 119*h*, and the holes 146*a* (holes 146*t* having an elliptical shape) which are formed in the fixed side connecting parts 146*g* and 146*h* are perpendicular to each other. Therefore, the image side spring member 14*x* and the object side spring member 14*y* can be connected with the common spring support member 11 with a high degree of positional accuracy.

In addition, in the connection part of the image side spring member 14*x* and the spring support member 11, there are spaces for rattling in the directions perpendicular to each other between the protruded parts 117*a* (protruded parts 117*t* whose cross section is a substantially elliptical shape), which are formed in the tip end parts 117 of the columnar shaped parts 119*g* and 119*h*, and the holes 146*a* (holes 146*t* having an elliptical shape) which are formed in the fixed side connecting parts 146*g* and 146*h*. Therefore, when the image side spring member 14*x* and the spring support member 11 are to be connected with each other, an excessive stress is not applied to the image side spring member 14*x* and thus deformation of the arm parts 148 of the image side spring member 14*x* can be prevented.

In addition, in the spring support member 11, the outer side faces 119*v* and 119*w* of all four columnar shaped parts 119 are extended in parallel with the lens optical axis "L" and thus the spring support member 11 is disposed so as to be along the side plate parts 181, 182, 183 and 184 of the yoke 18. On the other hand, the inner side faces 119*x*, 119*y* and 119*z* are slantingly extended to be formed in tapered faces so that the tip end side of the columnar shaped part 119 is made thinner. Therefore, since the root part of the columnar shaped part 119 is thicker, the strength of the columnar shaped part 119 is larger. Further, when the spring support member 11 is molded by using a die, the spring support member 11 is easily detached from the die. In addition, an area surrounded by the columnar shaped parts 119 is wider by the amount of that the inner side faces 119*x*, 119*y* and 119*z* of the columnar shaped part 119 are slantingly extended to be formed in tapered faces. Therefore, the magnets 17 can be easily disposed at positions between the columnar shaped parts 119.

Further, in this embodiment, the portions of the coil ends 34 and 35 which are wound around two binding pins 15 held by the movable body 3 are electrically connected with the spring pieces 14*a* and 14*b*. Therefore, when the coil end 34 of winding start and the coil end 35 of winding end of the first coil 31 and the second coil 32 (coil wire 30) are to be electrically connected with the spring pieces 14*a* and 14*b*, the coil ends 34 and 35 are not required to release from the binding pins 15. Further, preliminary solder for the coil ends 34 and 35 is not required and reinforcing adhesion of the coil ends 34 and 35 for preventing loosening and the like are not required. Moreover, since the preliminary solder is not required, a problem can be prevented that solder slag is stuck to the spring pieces 14a and 14b to cause deformation of the spring pieces 14a and 14b or to obstruct movement of the movable body 3. Therefore, even when the spring pieces 14a and 14b are utilized for power supply to the coil, a high productivity and a high quality can be obtained.

Further, since the binding pin 15 is made of metal, the coil ends 34 and 35 and the binding pins 15 are fixed to each other by welding, soldering or the like.

Further, the spring pieces 14a and 14b are provided with the coil connecting terminal parts 142, which are bent so as to be along a periphery of the binding pin 15. Therefore, a welding or soldering work is easily performed when the coil connecting terminal parts 142 and the coil ends 34 and 35 are to be connected with each other. Further, since a joining area of the coil connecting terminal part 142 is wider, the connected portion with a high degree of reliability can be obtained. Further, since the coil connecting terminal part 142 is provided with elasticity, the coil connecting terminal part 142 and the binding pin 15 can be located closer to each other in the assembling steps and thus a high degree of working efficiency is obtained.

In addition, some portions of the coil ends 34 and 35 drawing out for forming the first coil 31 and the second coil 32 are not provided with soldering and melting operation and thus flexibility of the coil wire 30 is secured. Therefore, even when a force is applied to the coil wire 30, disconnection of the coil wire 30 is hard to occur.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens drive device comprising:
    a support body;
    a movable body which includes a lens;
    a magnetic drive mechanism which includes a coil mounted on the movable body and a magnet mounted on the support body for magnetically driving the movable body with respect to the support body in a lens optical axis direction;
    two spring pieces which are connected between the movable body and the support body for supporting the movable body and which is used as a power supply member to the coil; and
    two binding pins which are provided in the movable body and around which coil ends of winding start and winding end of the coil are wound;
    wherein portions of the coil ends which are wound around the binding pins are electrically connected with the spring pieces;
    wherein the binding pin is made of metal;
    wherein the spring piece is provided with a coil connecting terminal part having a bent shape so as to be along a periphery of the binding pin, and the coil end is electrically connected with the coil connecting terminal part; and
    wherein the coil connecting terminal part is provided with elasticity so as to be capable of being resiliently deformed when the coil connecting terminal part is abutted with the portion of the coil end which is wound around the binding pin.

2. The lens drive device according to claim 1, wherein
    the coil end is wound around the binding pin in plural turns, and
    among the plural turns, a part of the plural turns on a winding start side of the coil end of winding start which is wound around the binding pin and a part of the plural turns on a winding end side of the coil end of winding end which is wound around the binding pin are performed with soldering or melting operation for electrical connection with the spring piece, and remaining parts of the plural turns are not performed with soldering or melting operation.

3. The lens drive device according to claim 1, wherein
    the movable body is movably supported in the lens optical axis direction by the support body through an image side spring member and an object side spring member which are made of a metal thin plate, and
    the two spring pieces which are used as a power supply member to the coil are structured so that the image side spring member is divided into two pieces.

4. The lens drive device according to claim 3, wherein
    each of the two spring pieces is provided with a fixed side connecting part which is held by the support body, a movable side connecting part which is connected with the movable body, and an arm part which connects the movable side connecting part with the fixed side connecting part,
    the movable side connecting part of the spring piece is provided with a coil connecting terminal part having a bent shape so as to be along a periphery of the binding pin, and
    the coil end is electrically connected with the coil connecting terminal part.

5. The lens drive device according to claim 4, wherein the coil connecting terminal part is provided with elasticity so as to be capable of being resiliently deformed when the coil connecting terminal part is abutted with the portion of the coil end which is wound around the binding pin.

6. The lens drive device according to claim 5, wherein
    the coil connecting terminal part is formed in a shape so that the coil connecting terminal part is capable of being resiliently bent toward an inner side in a radial direction, and
    a root portion of the coil connecting terminal part is formed with a cut-out part toward an inner side in the radial direction from an outer side so that the coil connecting terminal part is capable of being easily resiliently deformed.

7. The lens drive device according to claim 3, wherein
    the support body includes a spring support member which is provided with a frame-shaped part with which the object side spring member is connected and four columnar shaped parts which are protruded toward an imaging element side from the frame-shaped part, and
    the two spring pieces which are the image side spring member are supported by the columnar shaped part.

8. The lens drive device according to claim 7, wherein
    each of the two spring pieces is provided with a fixed side connecting part which is held by the support body, a movable side connecting part which is connected with the movable body, and an arm part which connects the movable side connecting part with the fixed side connecting part, the movable side connecting part of the spring piece is provided with a coil connecting terminal part having a bent shape so as to be along a periphery of the binding pin, and the coil end is electrically connected with the coil connecting terminal part.

9. The lens drive device according to claim 1, wherein the coil end is wound around the binding pin in plural turns, and among the plural turns, a part of the plural turns on a winding start side of the coil end of winding start which is wound around the binding pin and a part of the plural turns on a winding end side of the coil end of winding end which is wound around the binding pin are performed with soldering or melting operation for electrical connection with the spring piece, and remaining parts of the plural turns are not performed with soldering or melting operation.

10. A lens drive device comprising:

a support body;

a movable body which includes a lens;

a magnetic drive mechanism which includes a coil mounted on the movable body and a magnet mounted on the support body for magnetically driving the movable body with respect to the support body in a lens optical axis direction;

two spring pieces which are connected between the movable body and the support body for supporting the movable body and which is used as a power supply member to the coil; and two binding pins which are provided in the movable body and around which coil ends of winding start and winding end of the coil are wound;

wherein portions of the coil ends which are wound around the binding pins are electrically connected with the spring pieces;

the movable body is movably supported in the lens optical axis direction by the support body through an image side spring member and an object side spring member which are made of a metal thin plate;

the two spring pieces which are used as a power supply member to the coil are structured so that the image side spring member is divided into two pieces;

each of the two spring pieces is provided with a fixed side connecting part which is held by the support body, a movable side connecting part which is connected with the movable body, and an arm part which connects the movable side connecting part with the fixed side connecting part;

the movable side connecting part of the spring piece is provided with a coil connecting terminal part having a bent shape so as to be along a periphery of the binding pin; and the coil end is electrically connected with the coil connecting terminal part.

11. A lens drive device comprising:

a support body;

a movable body which includes a lens;

a magnetic drive mechanism which includes a coil mounted on the movable body and a magnet mounted on the support body for magnetically driving the movable body with respect to the support body in a lens optical axis direction;

two spring pieces which are connected between the movable body and the support body for supporting the movable body and which is used as a power supply member to the coil; and two binding pins which are provided in the movable body and around which coil ends of winding start and winding end of the coil are wound;

wherein portions of the coil ends which are wound around the binding pins are electrically connected with the spring pieces;

the movable body is movably supported in the lens optical axis direction by the support body through an image side spring member and an object side spring member which are made of a metal thin plate;

the two spring pieces which are used as a power supply member to the coil are structured so that the image side spring member is divided into two pieces;

the support body includes a spring support member which is provided with a frame-shaped part with which the object side spring member is connected and four columnar shaped parts which are protruded toward an imaging element side from the frame-shaped part; and the two spring pieces which are the image side spring member are supported by the columnar shaped part.

12. A lens drive device comprising:

a support body;

a movable body which includes a lens;

a magnetic drive mechanism which includes a coil mounted on the movable body and a magnet mounted on the support body for magnetically driving the movable body with respect to the support body in a lens optical axis direction;

two spring pieces which are connected between the movable body and the support body for supporting the movable body and which is used as a power supply member to the coil; and two binding pins which are provided in the movable body and around which coil ends of winding start and winding end of the coil are wound;

wherein portions of the coil ends which are wound around the binding pins are electrically connected with the spring pieces; and the coil end is wound around the binding pin in plural turns, and among the plural turns, a part of the plural turns on a winding start side of the coil end of winding start which is wound around the binding pin and a part of the plural turns on a winding end side of the coil end of winding end which is wound around the binding pin are performed with soldering or melting operation for electrical connection with the spring piece, and remaining parts of the plural turns are not performed with soldering or melting operation.

* * * * *